US012527486B2

(12) United States Patent
Matsuda et al.

(10) Patent No.: US 12,527,486 B2
(45) Date of Patent: Jan. 20, 2026

(54) MEASUREMENT DEVICE, MEASUREMENT SYSTEM, AND MEASUREMENT METHOD

(71) Applicant: SHARP KABUSHIKI KAISHA, Sakai (JP)

(72) Inventors: Kyohko Matsuda, Sakai (JP); Yoshihisa Adachi, Sakai (JP); Tetsuya Okumura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/666,143

(22) Filed: May 16, 2024

(65) Prior Publication Data
US 2024/0398247 A1 Dec. 5, 2024

(30) Foreign Application Priority Data

May 29, 2023 (JP) ................. 2023-087420

(51) Int. Cl.
A61B 5/024 (2006.01)
A61B 5/00 (2006.01)

(52) U.S. Cl.
CPC ........ A61B 5/02427 (2013.01); A61B 5/7203 (2013.01); A61B 2562/0238 (2013.01)

(58) Field of Classification Search
CPC .............. A61B 5/02427; A61B 5/7203; A61B 2562/0238
See application file for complete search history.

(56) References Cited

U.S. PATENT DOCUMENTS

| | | | |
|---|---|---|---|
| 11,199,451 B2* | 12/2021 | Saiki .................... | G01J 3/0205 |
| 2017/0098301 A1 | 4/2017 | Ikemoto et al. | |
| 2017/0251928 A1* | 9/2017 | Hashimoto ......... | A61B 5/0205 |
| 2018/0020961 A1* | 1/2018 | Mano .................. | A61B 5/6844 |
| | | | 600/323 |
| 2019/0298192 A1* | 10/2019 | Furukawa ......... | A61B 5/02007 |
| 2021/0085196 A1 | 3/2021 | Fukuda et al. | |
| 2021/0085229 A1 | 3/2021 | Narumi et al. | |
| 2022/0008157 A1 | 1/2022 | Maier-Hein et al. | |

FOREIGN PATENT DOCUMENTS

| | | |
|---|---|---|
| JP | S63161935 A | 7/1988 |
| JP | 2016158681 A | 9/2016 |
| JP | 2021045375 A | 3/2021 |
| JP | 2021151304 A | 9/2021 |
| JP | 2021532891 A | 12/2021 |
| WO | 2020044854 A1 | 3/2020 |

* cited by examiner

Primary Examiner — Dixomara Vargas
(74) Attorney, Agent, or Firm — ScienBiziP, P.C.

(57) ABSTRACT

A measurement device includes a signal acquisition unit that acquires a signal value indicating an intensity of light transmitted through a living body or reflected by the living body, a color information acquisition unit that converts the signal value into color information, a color information determination unit that determines whether the color information satisfies a determination condition, and a signal correction unit that adopts the signal value that is convertible into the color information satisfying the determination condition.

13 Claims, 7 Drawing Sheets

MEASUREMENT DEVICE, MEASUREMENT SYSTEM, AND MEASUREMENT METHOD

CROSS-REFERENCE TO RELATED APPLICATIONS

This application claims the benefit of priority to Japanese Patent Application Number 2023-087420 filed on May 29, 2023. The entire contents of the above-identified application are hereby incorporated by reference.

BACKGROUND

Technical Field

The disclosure relates to a measurement device, a measurement system, and a measurement method. The present application claims priority to JP 2023-87420 filed in Japan on May 29, 2023, the entire contents of which are hereby incorporated by reference.

JP S63-161935 A discloses a technique of incorporating a polarizing lens into an input optical system to capture an image of skin in a state where shine is removed, binarize a captured still image, quantify, as a skin roughness ratio, a ratio of a region in a full region in which dry scaly skin changes are occurring, and output a result of the quantified skin roughness.

SUMMARY

By irradiating a living body with light and measuring the transmitted or reflected light, it is possible to measure biometric information indicating states inside the skin, such as blood pressure, heart rate, and blood oxygen saturation. However, when the skin surface is rough, diffused reflected light and regular reflected light from the skin surface become stronger than when the skin surface is not rough, which may cause measurement accuracy to deteriorate. In the technique disclosed in JP S63-161935 A, to suppress the diffused reflected light and the regular reflected light, the polarizing lens is used to remove the shine. However, in the technique disclosed in JP S63-161935 A, the design of the optical system adapted to the focus and polarization direction of the polarizing lens is complicated.

Thus, it is an object of an aspect of the disclosure to provide a measurement device, a measurement system, and a measurement method capable of easily detecting a change in the state of a skin surface.

According to an embodiment of the disclosure, a measurement device includes a signal acquisition unit configured to acquire a signal value indicating an intensity of light transmitted through a living body or reflected by the living body, a color information acquisition unit configured to convert the signal value into color information, a color information determination unit configured to determine whether the color information satisfies a determination condition, and a signal correction unit configured to adopt the signal value that is convertible into the color information satisfying the determination condition.

A measurement system according to an embodiment of the disclosure includes the measurement device, and an information processing device configured to calculate biometric information based on change over time of the signal value adopted by the signal correction unit.

According to an embodiment of the disclosure, a measurement method includes acquiring a signal value indicating an intensity of light transmitted through a living body or reflected by the living body, converting the signal value into color information, determining whether the color information satisfies a determination condition, and adopting the signal value that is convertible into the color information satisfying the determination condition.

BRIEF DESCRIPTION OF DRAWINGS

The disclosure will be described with reference to the accompanying drawings, wherein like numbers reference like elements.

DESCRIPTION OF EMBODIMENTS

First Embodiment

Figure 1:
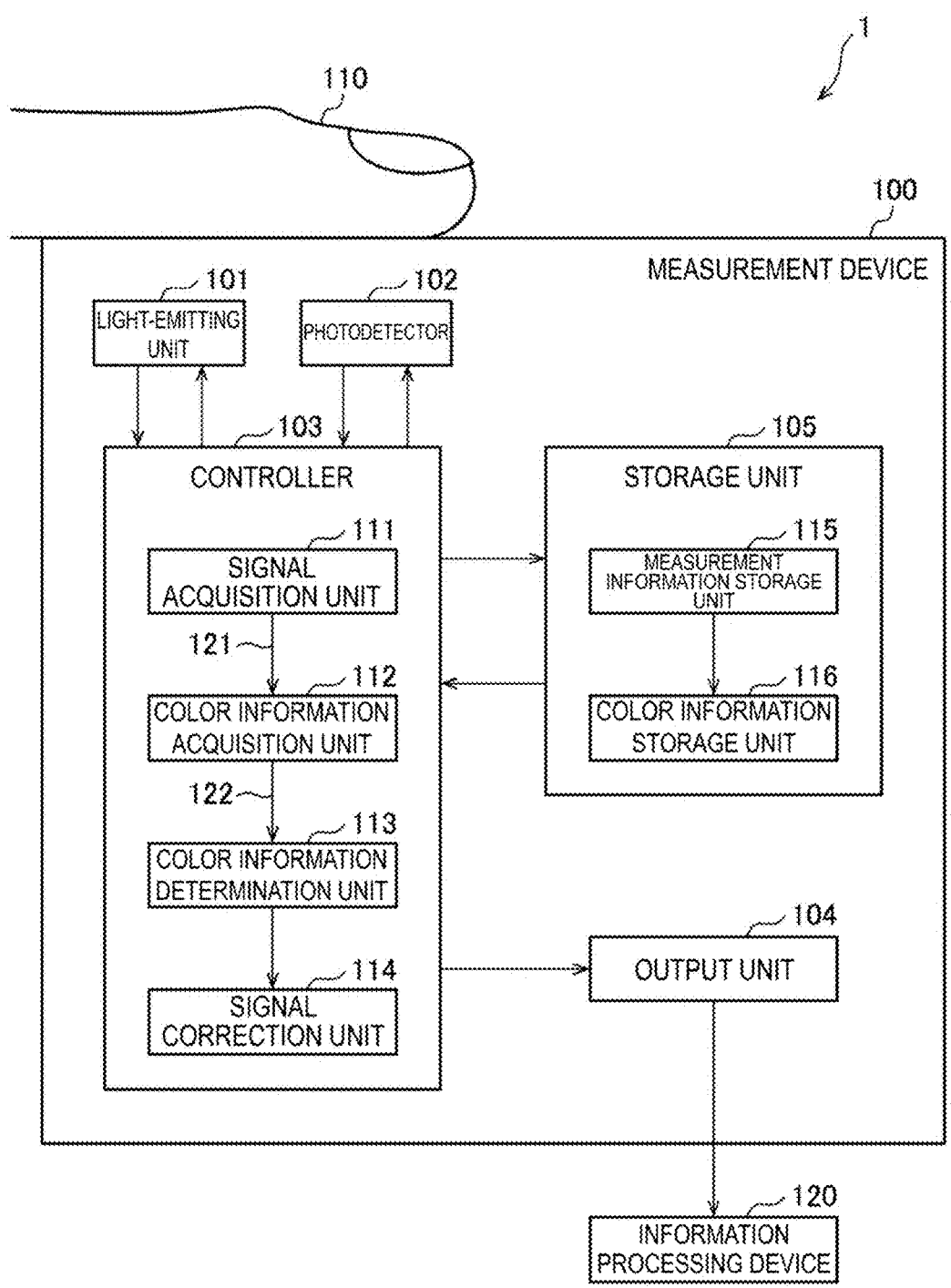
FIG. 1 is a block diagram illustrating an example of a configuration of a measurement system.

A first embodiment will be described with reference to FIG. 1 to FIG. 3. In the drawings, identical or equivalent elements are allocated the same reference signs, and redundant descriptions thereof are omitted.

FIG. 1 is a block diagram illustrating an example of a configuration of a measurement system 1 according to the present embodiment. The measurement system 1 includes a measurement device 100 and an information processing device 120.

The measurement device 100 emits light and measures the light transmitted through a living body 110 or reflected by the living body 110. Then, the information processing device 120 calculates biometric information indicating the state and the like of blood vessels inside the skin of the living body 110, based on a measurement result of the measurement device 100. Specifically, the information processing device 120 calculates the biometric information based on change over time of a signal value acquired and adopted by the measurement device 100. For example, the information processing device 120 is a personal computer (PC), a tablet terminal, a terminal dedicated to biometric information calculation, or the like. The biometric information is blood pressure, a pulse, blood oxygen saturation, or the like.

The measurement device 100 includes a light-emitting unit 101, a photodetector 102, a controller 103, an output unit 104, and a storage unit 105.

The light-emitting unit 101 emits light onto a portion where the skin of the living body 110 is exposed. The portion where the skin of the living body 110 is exposed is, for example, a finger of the living body 110. For example, the light-emitting unit 101 is configured by a light emitting diode (LED) having at least three colors of red (R), green (G), and blue (B). The light-emitting unit 101 may be configured by a single LED in which the single LED emits light of three wavelengths, or may be configured by three LEDs that emit light of three wavelengths, respectively.

The photodetector 102 measures the intensity of the light transmitted through the living body 110 or the light reflected by the living body 110, and the photodetector 102 is configured by a photodiode including a color filter. For example, the photodetector 102 is configured by a photodiode including a color filter with an RGB Bayer filter array. Alternatively, the photodetector 102 may be configured by a photodiode including a color filter such as RGBCy, RGBIR, or the like.

The light-emitting unit 101 and the photodetector 102 are installed at positions where the exposed portion of the skin of the living body 110 can be measured.

The controller 103 controls the entire measurement device 100 and executes various processing in accordance with programs and data stored in the storage unit 105. The controller 103 is configured by a processor such as a central processing unit (CPU), a graphic processing unit (GPU), or the like. The controller 103 is provided with a signal acquisition unit 111, a color information acquisition unit 112, a color information determination unit 113, and a signal correction unit 114.

The signal acquisition unit 111 acquires a signal value 121 indicating the intensity of the light transmitted through the living body 110 or reflected by the living body.

The color information acquisition unit 112 converts the signal value 121 into color information. The color information indicates values in a plurality of color elements. Specifically, the color element is an element constituting at least one of a color space and a color system. Then, based on the color information, the color information acquisition unit 112 calculates a determination index 122. Specifically, the color information acquisition unit 112 calculates the determination index 122 based on a difference between a value indicated by the color information and a reference value.

The color information determination unit 113 determines whether the color information satisfies a determination condition. The determination condition is that the determination index 122 is equal to or less than a color gamut threshold value.

The signal correction unit 114 adopts the signal value 121 that can be converted into the color information satisfying the determination condition.

The output unit 104 outputs the signal value 121 adopted by the signal correction unit 114. Alternatively, the output unit 104 outputs a time series signal constituted from the signal values 121 adopted by the signal correction unit 114. Alternatively, the output unit 104 outputs a determination result of the color information determination unit 113.

The storage unit 105 is a recording medium capable of recording various data, programs, and the like, and is configured by a hard disk, a solid state drive (SSD), a semiconductor memory, or the like. The storage unit 105 includes a measurement information storage unit 115 and a color information storage unit 116.

The measurement information storage unit 115 stores condition-met data, determination OK data, a program stored in advance, information registered by a user, and the like. For example, the user is the living body 110 or an administrator of the measurement device 100. The condition-met data indicates at least one of information indicating a time point at which the determination condition is satisfied, and the signal value 121 acquired at the time point at which the determination condition is satisfied. The information indicating the time point at which the determination condition is satisfied indicates a time at which the determination condition is satisfied or identification information associated with the time point at which the determination condition is satisfied. The determination OK data indicates at least one of information indicating a time point at which the signal value 121 adopted by the signal correction unit 114 is acquired, and the signal value 121 adopted by the signal correction unit 114.

Furthermore, the measurement information storage unit 115 stores a predetermined required number of data or a predetermined required time period necessary for measuring the biometric information to be measured. The predetermined required number of data or the predetermined required time period may be determined in accordance with the biometric information to be measured.

The color information storage unit 116 stores a color gamut threshold value, a reference value, a calculation formula relating to the color information, a calculation formula relating to the determination index, the determination condition, and the like. The color gamut threshold values, the reference value, and the like stored in the color information storage unit 116 can be changed by the user.

Furthermore, at least one of the measurement information storage unit 115 and the color information storage unit 116 stores information relating to the living body 110. As the information relating to the living body 110, a log or the like of the signal value 121 is stored.

Figure 2:
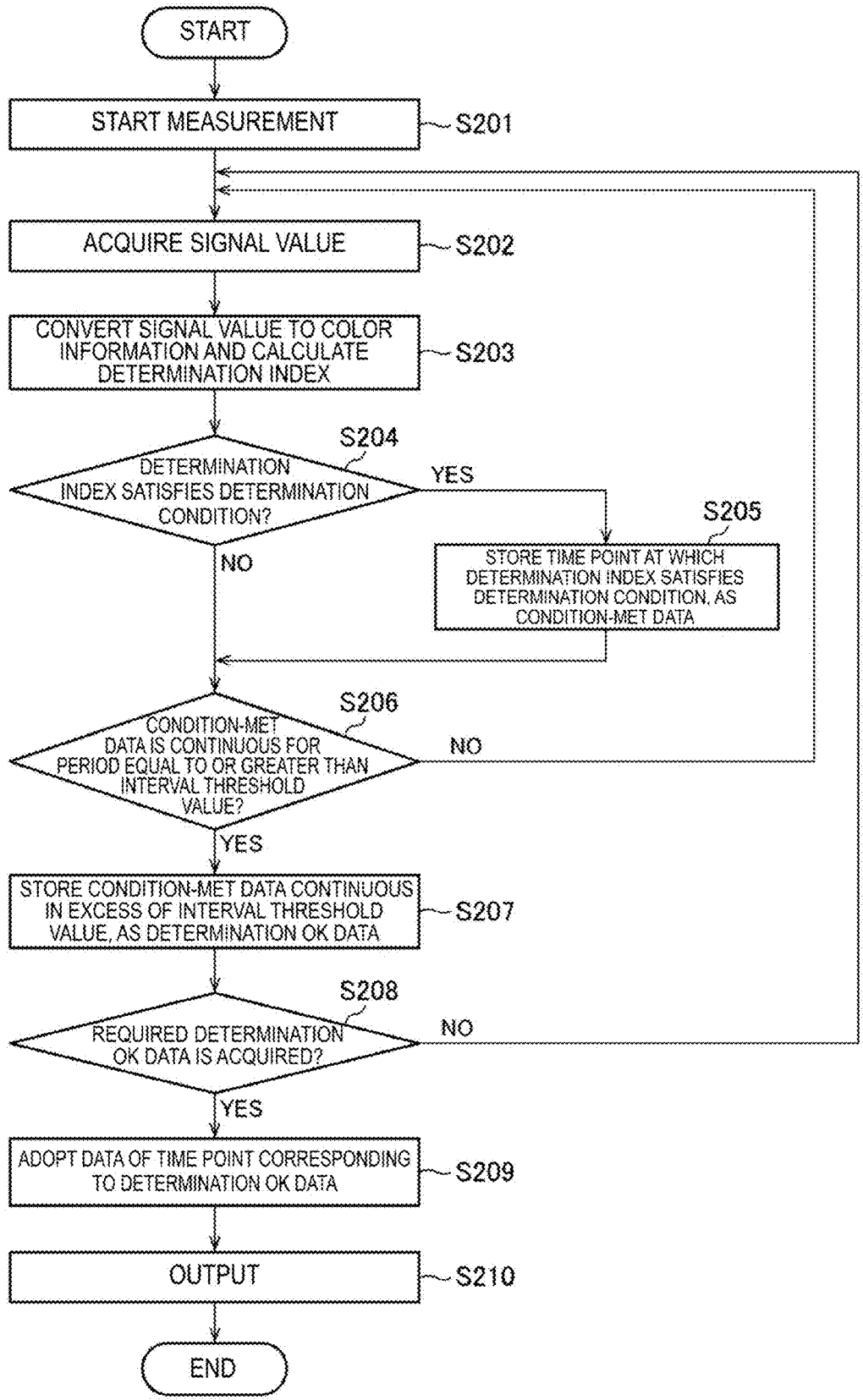
FIG. 2 is a flowchart illustrating an example of operations of a measurement device according to a first embodiment.

FIG. 2 is a flowchart illustrating an example of operations of the measurement device 100 according to the present embodiment.

At step S201, the measurement device 100 starts measurement processing. Specifically, when the measurement device 100 starts the measurement processing, the light-emitting unit 101 emits light, and the light is irradiated onto a location at which the skin of the living body 110 is exposed. The photodetector 102 receives the light transmitted through the living body 110 or the light reflected by the living body 110 and measures the intensity of the received light. That is, the measurement device 100 can receive the light transmitted through the living body 110 or the light reflected by the living body 110 and measure the intensity of the received light, by using the light emitting-element and the light-receiving element that are simple and small and that include an LED, a photodiode provided with a color filter, and the like.

At step S202, the signal acquisition unit 111 acquires the signal value 121 indicating the intensity of the light measured by the photodetector 102. Specifically, as the signal value 121, the signal value 121 indicating the intensity of the light transmitted through the living body 110 or reflected by the living body is acquired. When the light-emitting unit 101 is configured by the LED that emits the light of the three wavelengths of R, G, and B, the signal value 121 indicates lightness values corresponding to R, G, and B.

The signal acquisition unit 111 may acquire a time series signal indicating change over time of the signal values 121. For example, the signal acquisition unit 111 acquires a time series signal indicating change over time of the signal values 121 in the predetermined time period. Alternatively, the signal acquisition unit 111 acquires the time series signal indicating the change over time of the signal values 121 having a value in a predetermined range.

Further, for example, the signal acquisition unit 111 may calculate a signal indicating a pulse wave or absorbance from change over time of a value calculated by substituting the signal value 121 into a predetermined mathematical formula. The pulse wave indicates a change in volume of a blood vessel calculated based on change over time in the lightness values of R, G, and B. The absorbance is an optical density of a blood vessel, and is an index indicating a degree of light absorption by the blood vessel. For example, the signal acquisition unit 111 may calculate the absorbance in accordance with Lambert-Beer's law. Alternatively, the signal acquisition unit 111 may acquire a time series signal of values indicating the biometric information from change over time in the signal values 121, using an independent component analysis method, a pigment component separating method, or the like.

At step S203, the color information acquisition unit 112 converts the signal value 121 into the color information to calculate the determination index 122. The color information indicates values in the plurality of color elements. The color element is an element constituting at least one of a color space and a color system. Here, it is preferable that the color space and the color system in the color information are a color space and a color system that are less affected by ambient brightness than the RGB color space. For example, the color space in the color information to which the signal value 121 is converted is an HSL color space, an HSV color space, or the like. Alternatively, the color system in the color information to which the signal value 121 is converted is the L*C*h color system, the L*a*b color system, or the like.

The HSL color space indicates hue (H), saturation (S), and lightness (L). That is, when the color information acquisition unit 112 converts the signal value 121 into the color information using a conversion formula from the RGB color space to the HSL color space, the color information indicates a set of the hue H, the saturation S, and the lightness L for a location at which the skin of the living body 110 irradiated with the light emitted from the light-emitting unit 101 is exposed. Brightness and whiteness of light can be expressed by the lightness L and the saturation S.

The HSV color space indicates hue H, saturation S, and lightness V (Value). When the color information acquisition unit 112 converts the signal value 121 into the color information using a conversion formula from the RGB color space to the HSV color space, the color information to which the signal value 121 is converted indicates a set of the hue H, the saturation S, and the lightness V for the location at which the skin of the living body 110 irradiated with the light by the light-emitting unit 101 is exposed. Brightness and whiteness of light can be expressed by the lightness V and the saturation S.

The L*C*h color system indicates lightness (L), chroma (C*), and hue (h). That is, when the color information acquisition unit 112 converts the signal value 121 into the color information using a conversion formula from the RGB color space to the L*c*h color system, the color information to which the signal value 121 is converted indicates a set of the lightness L, the chroma C*, and the hue h for the location at which the skin of the living body 110 irradiated with the light by the light-emitting unit 101 is exposed. Brightness and whiteness of light can be expressed by the lightness L, the chroma C*, and the hue h.

The L*a*b color system indicates lightness L, chromaticity a*, and chromaticity b*. The chromaticity a* and the chromaticity b* indicate hue and saturation. That is, when the color information acquisition unit 112 converts the signal value 121 into the color information using a conversion formula from the RGB color space to the L*a*b color system, the color information to which the signal value 121 is converted indicates a set of the lightness L, the chromaticity a*, and the chromaticity b* for the location at which the skin of the living body 110 irradiated with the light by the light-emitting unit 101 is exposed. Brightness and whiteness of light can be expressed by the lightness L, the chromaticity a*, and the chromaticity b*.

The brightness and the whiteness of the light expressed in the HSL color space, the HSV color space, the L*C*h color system, or the L*a*b color system are due to the fact that the light received by the photodetector 102 is significantly bright due to an increase in the diffused reflected light and the regular reflected light from the skin surface. Thus, the fact that the received light is significantly bright as a result of the diffused reflected light and the regular reflected light from the skin surface being increased due to the roughness of the skin surface is not caused by the state of the blood vessel of the living body 110, but is caused by the roughness of the skin surface. Thus, the measurement device 100 can detect a change in the skin surface by analyzing the brightness and whiteness of the light.

Since the brightness and the whiteness of the light can be expressed by the HSL color space, the HSV color space, the L*C*h color system, or the L*a*b color system, the color information can express the brightness and the whiteness of the location at which the skin of the living body 110 irradiated with the light emitted from the light-emitting unit 101 is exposed.

Here, the color information acquisition unit 112 calculates the determination index 122 based on the difference between the value indicated by the color information and the reference value. The reference value is determined based on color information converted from the signal value 121 measured in advance. For example, the reference value indicates color information converted from the signal value 121 measured by the signal acquisition unit 111 when a measurement subject who is the living body 110 uses the measurement device 100 for the first time. Alternatively, the reference value may indicate color information converted from the signal value 121 measured by the signal acquisition unit 111 when the physical condition of the measurement subject who is the living body 110 is good. That is, the color information acquisition unit 112 stores the reference value indicating a reference state of the skin of each individual. Alternatively, the reference value may indicate color information converted from the signal value 121 measured by the signal acquisition unit 111 when a measurement environment is stable.

For example, it is assumed that the color information acquisition unit 112 converts the lightness values corresponding to R, G, and B indicated by the signal value 121 into the color information indicating a lightness L', using a conversion formula from the RGB color space to the HSV color space. Furthermore, it is assumed that a reference value L0 for a lightness L is stored in the color information storage unit 116. In this case, the color information acquisition unit 112 calculates a difference between the lightness L' and the reference value L0 (=L'−L0) as the determination index 122.

For example, in the case of a measurement environment in which the measurement device 100 is provided with a light-shielding cover and the influence of illumination around the measurement device 100 can be eliminated, the difference between the lightness L' and the reference value L0 ((=L'−L0) is calculated as the determination index 122 for the lightness L.

Further, for example, it is assumed that the reference value L0 for the lightness L and a reference value S0 for the saturation S are stored in the color information storage unit 116. In this case, the color information acquisition unit 112 calculates the difference between the lightness L' and the reference value L0 (=L'−L0) and a difference between a saturation S' and the reference value S0 (=S'−S0) as the determination index 122.

Further, the color information acquisition unit 112 may determine that an illumination environment has changed when a change amount of the signal value 121 within a predetermined time period exceeds a threshold value. In a case where it is determined that the illumination environment has changed, the color information acquisition unit 112 may change the calculation formula of the determination index 122. For example, in a case where it is determined that the illumination environment has not changed, the color information acquisition unit 112 calculates the difference between the lightness L' and the reference value L0 (=L'−L0) as the determination index 122. On the other hand, in a case where it is determined that the illumination environment has changed, the color information acquisition unit 112 may calculate the difference between the lightness L' and the reference value L0 (=L'−L0) and the difference between the saturation S' and the reference value S0 (=S'−S0) as the determination index 122.

For example, the color information acquisition unit 112 calculates the determination index 122 at each of time points at which the signal value 121 is acquired at step S202. Alternatively, the color information acquisition unit 112 may calculate the determination index 122 every time the signal value 121 is acquired a predetermined number of times. Alternatively, the color information acquisition unit 112 may calculate the determination index 122 by converting an average value of a predetermined number of signal values into the color information. For example, the predetermined number of times is three. It is preferable that the color information acquisition unit 112 calculates the determination index 122 at each of the time points at which the signal value 121 is acquired at step S202, because the change over time in the intensity of the light received by the photodetector 102 can be accurately obtained in detail.

At step S204, the color information determination unit 113 determines whether the determination index 122 satisfies the determination condition. The determination condition is that the determination index 122 is less than the color gamut threshold value. For example, the color gamut threshold value is determined in accordance with a type of the biometric information. For example, the color gamut threshold value when the type of biometric information that is the measurement target is the pulse may be different from the color gamut threshold value when the type of biometric information that is the measurement target is the blood pressure.

For example, at step S203, it is assumed that the color information acquisition unit 112 calculates the difference between the lightness L' and the reference value L0 (=L'−L0) as the determination index 122. Furthermore, it is assumed that a color gamut threshold value Lth for the lightness L is stored in the color information storage unit 116. The determination condition is assumed to be L'−L0<Lth. In this case, the color information determination unit 113 determines whether L'−L0<Lth is satisfied. The determination condition not being satisfied, i.e., the fact that L'−L0<Lth is not satisfied, indicates that the color information is greater than the reference value by an amount equal to or greater than the color gamut threshold value. The fact that the color information is greater than the reference value by an amount equal to or greater than the color gamut threshold value is considered to be correlated with a phenomenon in which light received by the photodetector 102 becomes brighter or whiter due to an increase in the diffused reflected light and the regular reflected light caused by roughness of the surface of the skin.

The determination condition may be related to at least one of a plurality of color spaces and a plurality of color systems. For example, the determination condition may be that the determination index 122 is less than a color gamut threshold value RGth for the RGB color space and the determination index 122 is less than the color gamut threshold value Lth for the lightness L. In this case, it is assumed that the color gamut threshold value Lth for the lightness L and the color gamut threshold value RGth for the RGB color space are stored in the color information storage unit 116. Furthermore, in that case, the determination index 122 indicates a value for the RGB color space and a value for the HSL color space.

For example, the color information acquisition unit 112 calculates the difference between the lightness L' and the reference value L0 (=L'−L0) as the determination index 122, and also calculates a difference between a lightness value R' corresponding to R and a lightness value G' corresponding to G (=R'−G') as the determination index 122. The lightness value R' corresponding to R is a lightness value corresponding to R indicated by the signal value 121, and the lightness value G' corresponding to G is a lightness value corresponding to G indicated by the signal value 121. In this case, the determination condition is that L'−L0<Lth, and that R'−G'<RGth.

Since the color information determination unit 113 determines whether the determination index 122 satisfies the determination condition for a plurality of color spaces, it is possible to perform more a detailed determination than when determining whether the determination condition for one color space is satisfied.

Note that the signal value 121 with which the biometric information can be appropriately measured may vary depending on the performance of the light-emitting unit 101, the performance of the photodetector 102, the illumination around the measurement device 100, and the state of the skin of the living body 110. Thus, it is preferable that the color gamut threshold value is set in accordance with the performance of the light-emitting unit 101, the performance of the photodetector 102, the illumination around the measurement device 100, and the state of the skin of the living body 110.

The plurality of color elements corresponding to the values indicated by the color information and the reference value are determined in accordance with the type of biometric information to be measured. That is, the color space used for calculating the color information, the color system used for calculating the color information, and the reference value may be determined in accordance with the type of biometric information to be measured.

Change over time of the determination index 122 will be described with reference to FIG. 3.

Figure 3:
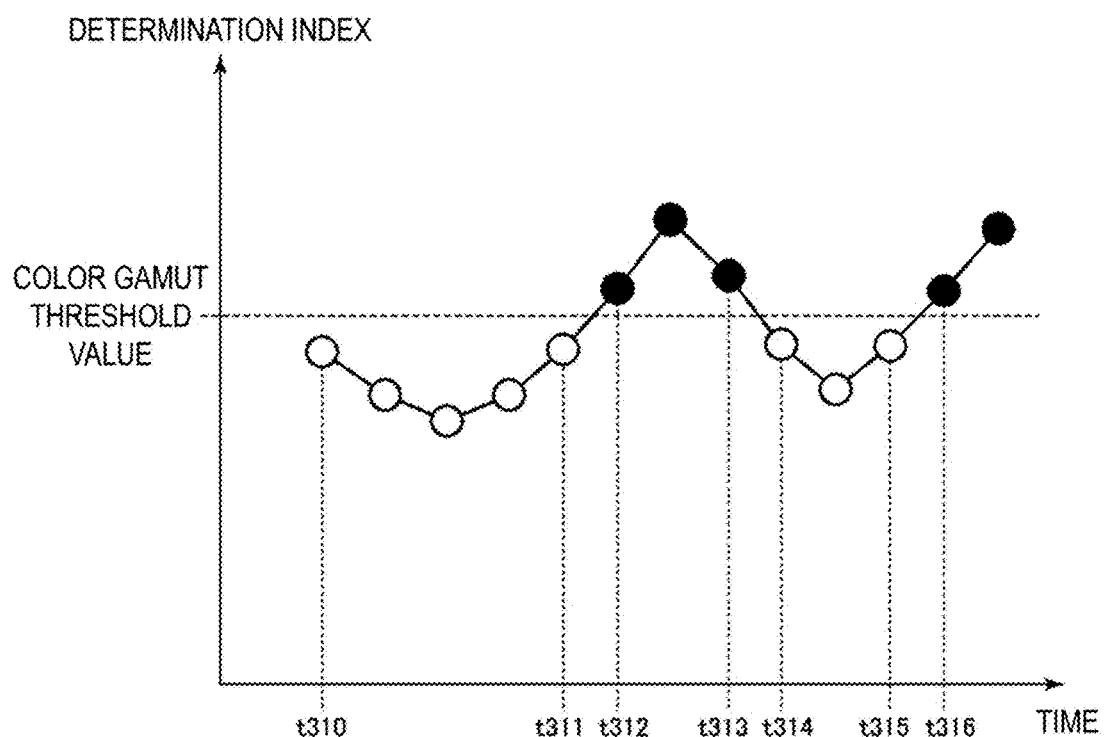
FIG. 3 is a diagram illustrating a graph showing an example of a color gamut threshold value and change over time of a determination index.

FIG. 3 is a diagram illustrating a graph showing an example of a color gamut threshold value and change over time of the determination index 122. In FIG. 3, the horizontal axis represents time, and the vertical axis represents the determination index. Each of points shown in FIG. 3 indicates a value of the determination index calculated based on the signal value 121 acquired at different points in time.

For example, the determination indices 122 from a time point t312 to a time point t313 and after a time point t316 have values equal to or greater than the color gamut threshold value. This is because the light received by the photodetector 102 becomes significantly brighter or whiter due to an increase in the diffused reflected light and the regular reflected light from the skin surface as a result of the roughness of the skin surface between the time points t312 and t313 and after the time point t316. Therefore, by determining whether the determination index 122 is less than the color gamut threshold value, the measurement device 100 can specify a time point at which the diffused reflected light and the regular reflected light from the skin surface increase due to the roughness of the skin surface.

Furthermore, the intensity of the light transmitted through the skin of the living body 110 or reflected by the skin of the living body 110 and received by the photodetector 102 depends on the state of the skin of the individual and is different for each individual. However, since the reference value for each individual living body 110 is stored in the color information storage unit 116, the measurement device 100 can specify the time point at which the diffused reflected light and the regular reflected light from the skin surface increase due to the roughness of the skin surface for each individual living body 110, by using the reference value set for each individual living body 110.

Referring again to FIG. 2, operations of the measurement device 100 will now be described.

When the determination index 122 does not satisfy the determination condition at step S204, the controller 103 shifts the processing to step S206.

On the other hand, when the determination index 122 satisfies the determination condition at step S204, at step S205, the color information determination unit 113 causes the measurement information storage unit 115 to store information indicating a time point at which the determination index 122 satisfies the determination condition, as the condition-met data. Alternatively, the color information determination unit 113 causes the measurement information storage unit 115 to store the signal value 121 acquired at the time point at which the determination index 122 satisfies the determination condition, as the condition-met data. Then, the controller 103 shifts the processing to step S206.

At step S206, the color information determination unit 113 determines whether the condition-met data is continuous for a period equal to or greater than an interval threshold value. That is, the color information determination unit 113 determines whether the time series signal values 121 acquired by the signal acquisition unit 111 are continuously convertible into the color information satisfying the determination condition for the period equal to or greater than the interval threshold value.

For example, the interval threshold value is the number of the determination indices 122. The fact that a predetermined number of the determination indices 122 are continuously calculated is synonymous with the fact that a time period required to acquire the continuous determination indices 122 is a predetermined time period. Thus, the interval threshold value may be the predetermined time period. For example, the interval threshold value is determined in accordance with the type of biometric information.

At step S206, when the condition-met data is not continuous for the period equal to or greater than the interval threshold value, the controller 103 returns the processing to step S202. When the fact that the condition-met data is not continuous for the period equal to or greater than the interval threshold value is repeated a predetermined number of times or more, the color information determination unit 113 causes the output unit 104 to output a message to alert the living body 110. For example, the output unit 104 may cause a display (not illustrated) to which the measurement device 100 is connected to display characters indicating a message for alerting the living body 110. Alternatively, the output unit 104 may cause a speaker (not illustrated) to which the measurement device 100 is connected to output sound indicating a message for alerting the living body 110.

For example, it is assumed that the living body 110 places a finger of the living body 110 on the measurement device 100, and the finger of the living body 110 is irradiated with light emitted from the light-emitting unit 101. In this case, the output unit 104 outputs a message indicating an instruction to reposition the finger. Alternatively, the message output by the output unit 104 may be a message indicating an instruction to place a different finger on the measurement device 100.

On the other hand, when, at step S206, the condition-met data is continuous for the period equal to or greater than the interval threshold value, at step S207, the signal correction unit 114 causes the measurement information storage unit 115 to store the condition-met data that is continuous for the period equal to or greater than the interval threshold value, as the determination OK data. That is, the signal correction unit 114 adopts the signal value 121 that can be converted into the color information satisfying the determination condition that is continuous for the period equal to or greater than the interval threshold value.

Referring back to FIG. 3, the determination OK data will be described. In the following description, it is assumed that the interval threshold value is that the number of determination indices 122 is four.

Since the determination index 122 is equal to or less than the color gamut threshold value from the time point t314 to the time point t315 illustrated in FIG. 3, the determination index 122 satisfies the determination condition from the time point t314 to the time point t315. In this case, since the number of the determination indices 122 from the time point t314 to the time point t315 is three, the number of the determination indices 122 from the time point t314 to the time point t315 is less than the interval threshold value. Thus, the determination OK data is not stored in the measurement information storage unit 115 for the time point t314 to the time point t315.

On the other hand, from the time point t310 to the time point t311, the determination index 122 is equal to or less than the color gamut threshold value, and from the time point t310 to the time point t311, the number of determination indices 122 is five. Thus, the determination index 122 satisfies the determination condition from the time point t310 to the time point t311, and the number of the determination indices 122 is equal to or greater than the interval threshold value. Thus, the determination OK data is stored in the measurement information storage unit 115 for the time point t310 to the time point t11.

Change over time indicating a cardiac beat of the blood vessel of the living body 110 is reflected in a waveform constituted by the time series signal values 121. That is, the biometric information of the living body 110 is reflected in the waveform constituted by the time series signal values 121. However, since the intensity of the light transmitted through the living body 110 or reflected by the living body 110 fluctuates with time due to body movement, the intensity may change due to regular reflected light or diffused reflected light. Thus, in the processing at step S207, the signal correction unit 114 does not cause the measurement information storage unit 115 to store, as the determination OK data, the condition-met data that is not continuous for the period equal to or greater than the interval threshold value. That is, the measurement device 100 excludes the signal values 121 that are not continuous for the period equal to or greater than the interval threshold value.

At step S208, the signal correction unit 114 determines whether the required determination OK data is acquired. Specifically, the signal correction unit 114 determines whether the determination OK data of the predetermined required number of data or the predetermined required time period stored in the measurement information storage unit 115 is acquired.

When the required determination OK data is not acquired at step S208, the controller 103 returns the processing to step S202. On the other hand, when the required determination OK data is acquired at step S208, at step S209, the signal correction unit 114 adopts the data corresponding to the time point of the determination OK data stored in the measurement information storage unit 115. For example, when the signal acquisition unit 111 acquires a signal constituted by the time series signal values 121, the signal correction unit 114 extracts data corresponding to the time point of the determination OK data from the acquired signal. Alternatively, when a signal is generated by data corresponding to the time point of the determination OK data, the signal correction unit 114 may adopt the generated signal.

At step S210, the output unit 104 outputs the adopted data. Furthermore, the output unit 104 may output information necessary for calculating the biometric information to be measured. Then, the information processing device 120 calculates the biometric information based on change over time of the signal value 121 adopted by the signal correction unit 114.

That is, in the processing at step S207, the signal correction unit 114 causes the measurement information storage unit 115 to store the condition-met data that is continuous for the period equal to or greater than the interval threshold value, as the determination OK data. Then, at step S210, the output unit 104 outputs the data corresponding to the time point of the determination OK data stored in the measurement information storage unit 115. Thus, the information processing device 120 calculates the biometric information based on the change over time of the signal value 121 that is suitable for calculating the biometric information and that is continuous for the period equal to or greater than the interval threshold value.

As described above, the measurement device 100 according to the present embodiment excludes the signal value 121 indicating a significant change in light due to a change in the state of the skin surface of the living body 110 from the signal values 121 used to calculate the biometric information. That is, the measurement device 100 according to the present embodiment does not adopt the signal value 121 acquired when irradiating, with light, the location at which the skin surface of the living body 110 is rough. Then, the measurement device 100 according to the present embodiment adopts the signal value 121 that is suitable for measuring the biometric information and that is acquired by irradiating, with light, a location at which the skin surface is not rough. As a result, the information processing device 120 can accurately calculate the biometric information based on the signal value 121 acquired by irradiating, with light, the location at which the skin surface is not rough.

Modified Example of First Embodiment

A modified example of the first embodiment will be described below with reference to FIG. 4. In the drawings, identical or equivalent elements are allocated the same reference signs, and redundant descriptions thereof are omitted.

The difference between the measurement device 100 according to the present modified example and the measurement device 100 according to the first embodiment is that the measurement device 100 according to the present modified example adopts data satisfying a determination condition without using an interval threshold value. That is, the signal correction unit 114 according to the present modified example adopts the signal value 121 that can be converted into the color information satisfying the determination condition among the time series signal values acquired by the signal acquisition unit 111.

Figure 4:
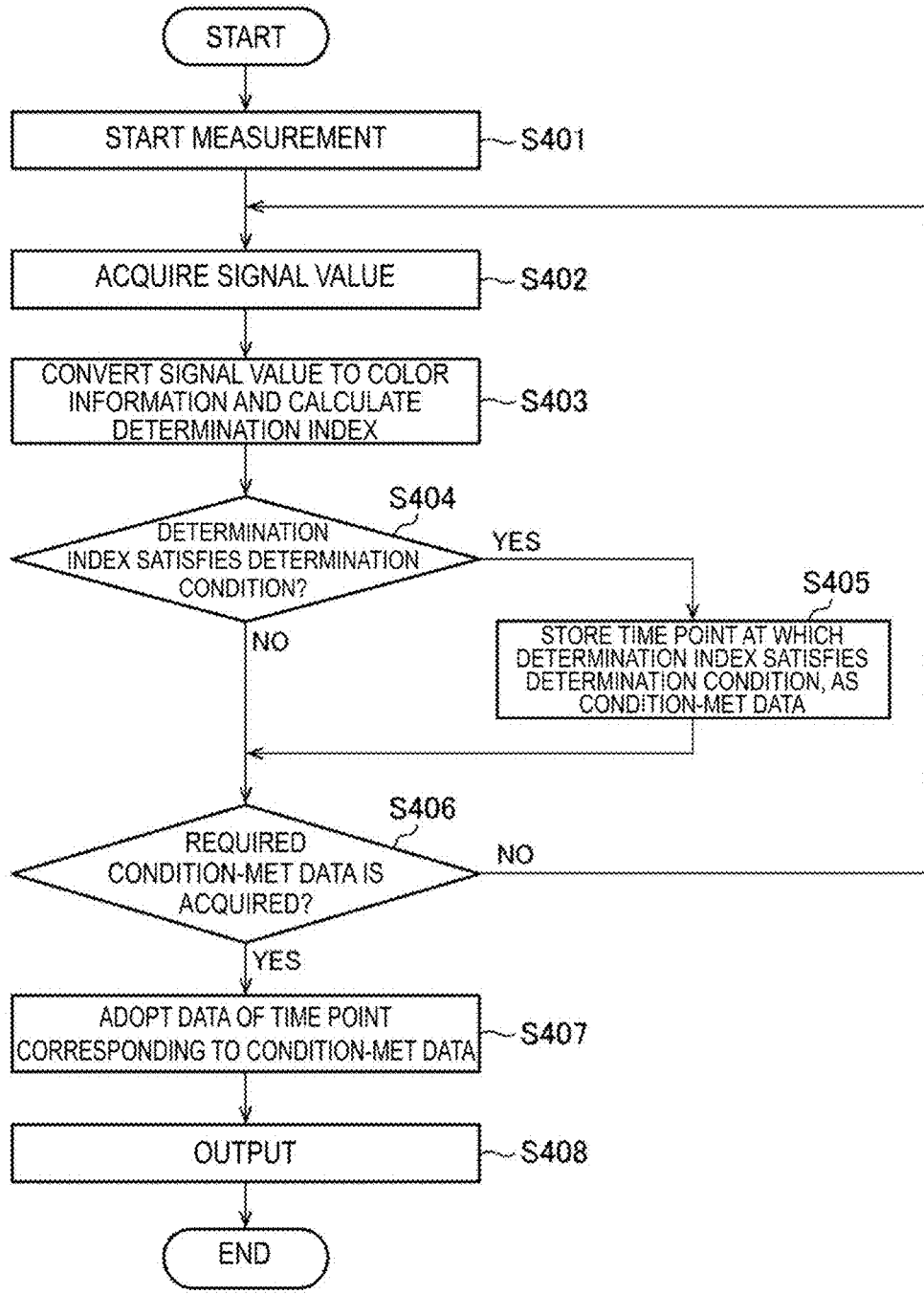
FIG. 4 is a flowchart illustrating an example of operations of the measurement device according to a modified example according to the first embodiment.

FIG. 4 is a flowchart illustrating an example of operations of the measurement device 100 according to the present modified example. Since processing from step S401 to step S405 is the same as the processing from step S201 to step S205 illustrated in FIG. 2, a detailed description thereof will be omitted.

At step S406, the signal correction unit 114 determines whether the required condition-met data is acquired. Specifically, the signal correction unit 114 determines whether the condition-met data of a predetermined required number of data or a predetermined required time period stored in the measurement information storage unit 115 is acquired.

If it is determined at step S406 that the required condition-met data has not been acquired, the controller 103 returns the processing to step S402. On the other hand, if the required condition-met data is acquired at step S406, at step S407, the signal correction unit 114 adopts the data of the time point corresponding to the condition-met data stored in the measurement information storage unit 115. As a result, the measurement device 100 according to the present modified example can adopt more data than the measurement device 100 according to the first embodiment. Furthermore, since the condition-met data does not need to be continuous for the period equal to or greater than the interval threshold value, in the measurement device 100 according to the present modified example, the time required for measurement can be reduced compared with the measurement device 100 according to the first embodiment.

Second Embodiment

A second embodiment will be described with reference to FIG. 5 to FIG. 7. In the drawings, identical or equivalent elements are allocated the same reference signs, and redundant descriptions thereof are omitted.

Figure 5:
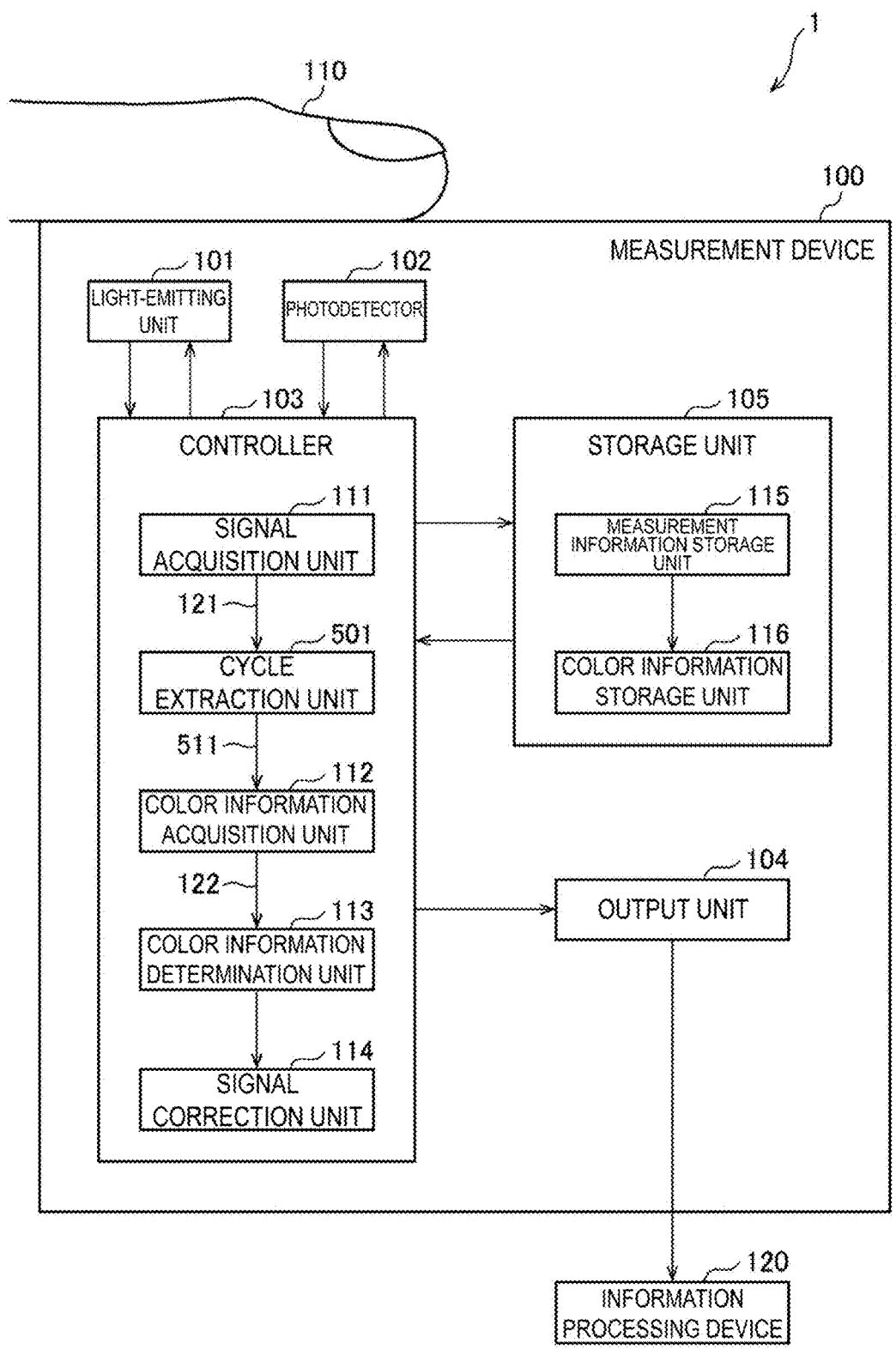
FIG. 5 is a block diagram illustrating an example of a configuration of the measurement system according to a second embodiment.

FIG. 5 is a block diagram illustrating an example of a configuration of the measurement system 1 according to the present embodiment. The measurement system 1 illustrated in FIG. 5 is different from the measurement system 1 illustrated in FIG. 1 in that the measurement device 100 included in the measurement system 1 illustrated in FIG. 5 is provided with a cycle extraction unit 501.

The cycle extraction unit 501 extracts a pulse signal 511 constituting a cycle from the time series signal indicating the change over time of the signal values 121.

The color information acquisition unit 112 according to the present embodiment converts each of the plurality of signal values 121 constituting the pulse signal 511 into the color information.

The signal correction unit 114 according to the present embodiment adopts the pulse signal 511 constituted by the signal values 121 that can be converted into the color information satisfying the determination condition.

The output unit 104 according to the present embodiment outputs the signal values 121 constituting the pulse signal 511 adopted by the signal correction unit 114. Alternatively, the output unit 104 outputs a time series signal constituted by the pulse signals adopted by the signal correction unit 114.

The measurement information storage unit 115 according to the present embodiment further stores condition-not-met data and a condition-met pulse. The condition-not-met data indicates at least one of information indicating a time point at which the determination condition is not satisfied, and the signal value 121 acquired at the time point at which the determination condition is not satisfied. The information indicating the time point at which the determination condition is not satisfied indicates at least one of a time or identification information associated with the time point. The condition-met pulse indicates the pulse signal 511 constituted by only the time points of the condition-met data.

Furthermore, the measurement information storage unit 115 according to the present embodiment stores a predetermined required number of pulses or a predetermined required time period necessary for measuring the biometric information to be measured. The predetermined required number of pulses or the predetermined required time period may be determined in accordance with the type of biometric information to be measured.

Figure 6:
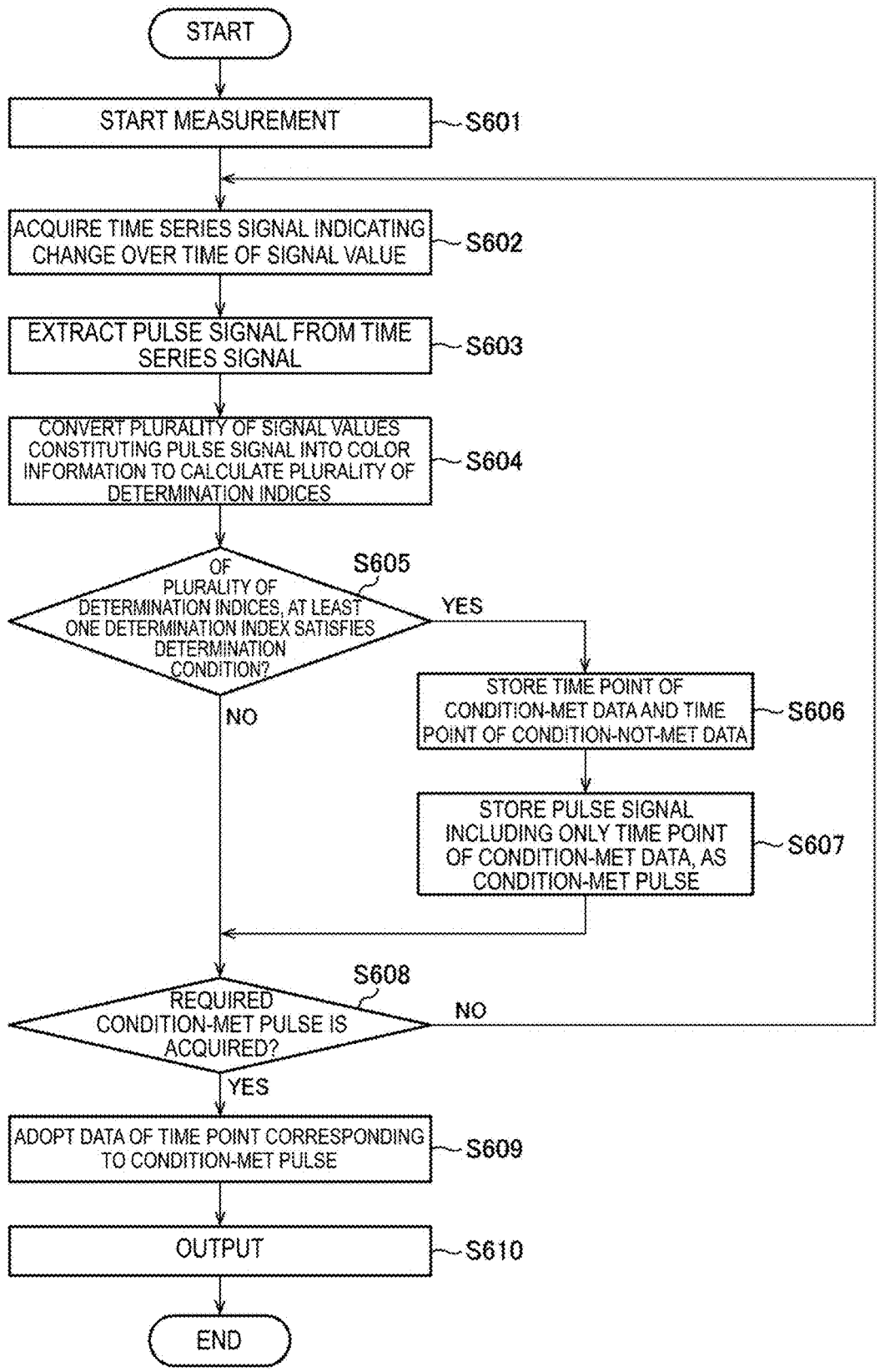
FIG. 6 is a flowchart illustrating an example of operations of the measurement device according to the second embodiment.

FIG. 6 is a flowchart illustrating an example of operations of the measurement device 100 according to the present embodiment. Since processing at step S601 is the same as the processing at step S201 illustrated in FIG. 2, a detailed description thereof will be omitted.

At step S602, the signal acquisition unit 111 acquires the signal value 121 indicating the intensity of the light measured by the photodetector 102. The signal acquisition unit 111 may calculate a sum or a product of values obtained by multiplying the lightness values of each of R, G, and B indicated by the signal value 121 by a predetermined coefficient. Then, the signal acquisition unit 111 acquires a time series signal indicating change over time of the signal values 121.

Alternatively, the signal acquisition unit 111 may calculate an absorbance signal and a pulse wave signal from change over time of a value calculated by substituting the signal value 121 into a predetermined mathematical formula. Alternatively, the signal acquisition unit 111 may acquire a time series signal of values indicating the biometric information from change over time in the signal values 121, using an independent component analysis method, a pigment component separating method, or the like.

For example, since the heart of the living body 110 repeats contraction and expansion, blood vessels pulsate. In a case where the signal value 121 indicates the pulsation of the blood vessel, the signal value 121 repeatedly increases and decreases in accordance with a period of the pulsation. Similarly, since respiration performed by the living body 110 has periodicity, in a case where the signal value 121 indicates respiratory movement, the signal value 121 repeatedly increases and decreases. That is, biological activity has periodicity, and a cycle indicated by the periodicity reflects the health condition of the living body 110. Thus, when biometric information having periodicity is measured, it is possible to accurately analyze the health condition of the living body 110 by analyzing each pulse extracted by dividing the time series signal into each of periods. Therefore, in the measurement device 100 according to the present embodiment, an interval of data to be used is divided into each of a predetermined cycle.

Therefore, at step S603, the cycle extraction unit 501 extracts the pulse signal 511 from the time series signal acquired at step S602. Specifically, the cycle extraction unit 501 extracts an interval satisfying a pulse extraction condition from the time series signal, as the pulse signal 511 for each cycle. The interval indicating the cycle is set in accordance with the biometric information to be measured.

For example, it is assumed that the time series signal indicates the pulse wave signal and the type of biometric information to be measured is a heart rate or a blood pressure. In this case, an interval from a rising edge to a falling edge of the pulse wave signal due to the contraction and expansion of the signal is set as one cycle. Then, the cycle extraction unit 501 causes the measurement information storage unit 115 to store at least one of information indicating time points at which the signal values 121 constituting the pulse signal 511 are acquired, and the signal values 121 constituting the pulse signal 511.

At step S604, the color information acquisition unit 112 converts the plurality of signal values 121 constituting the pulse signal 511 into the color information to calculate the plurality of determination indices 122. Since the processing to convert the signal values 121 into the color information and calculate the determination indices 122 at step S604 is the same as the processing at step S203 illustrated in FIG. 2, a detailed description thereof will be omitted.

At step S605, the color information determination unit 113 determines whether at least one of the determination indices 122, among the plurality of determination indices 122 calculated in step S604, satisfies a determination condition. Specifically, the color information determination unit 113 determines whether each of the plurality of determination indices 122 satisfies the determination condition. Since the processing to determine whether each of the determination indices 122 satisfies the determination condition at step S605 is the same as the processing at step S204 illustrated in FIG. 2, a detailed description thereof is omitted.

In a case where all of the determination indices 122 do not satisfy the determination condition at step S605, the controller 103 shifts the processing to step S608. On the other hand, in a case where at least one of the determination indices 122, among the plurality of determination indices 122, satisfies the determination condition at step S605, in step S606, the color information determination unit 113 causes the measurement information storage unit 115 to store information indicating a time point at which the determination index 122 does not satisfy the determination condition as the condition-not-met data, and causes the measurement information storage unit 115 to store information indicating a time point at which the determination index 122 satisfies the determination condition as the condition-met data.

At step S607, the color information determination unit 113 causes the measurement information storage unit 115 to store the pulse signal 511 including only the time point of the condition-met data, as the condition-met pulse. In other words, the color information determination unit 113 does not cause the measurement information storage unit 115 to store the pulse signal 511 including the condition-not-met data as the condition-met pulse.

At step S608, the signal correction unit 114 determines whether a required condition-met pulse is acquired. Specifically, the signal correction unit 114 determines whether the pulse signal 511 of the predetermined required number of pulses or the predetermined required time period stored in the measurement information storage unit 115 is acquired.

In a case where the required condition-met pulse is not acquired at step S608, the controller 103 returns the processing to step S602. On the other hand, in a case where the required condition-met pulse is acquired at step S608, at step S609, the signal correction unit 114 adopts the data corresponding to the time point of the condition-met pulse stored in the measurement information storage unit 115. That is, the signal correction unit 114 does not adopt the pulse signal 511 including the condition-not-met data, and adopts only a high-quality pulse in which data of one cycle is completely collected.

Further, the signal correction unit 114 may determine whether the condition-met pulse continues for an interval period to or greater than a predetermined number of times. That is, the signal correction unit 114 determines whether the pulse signal 511 including only the time point of the condition-met data continues for the interval equal to or greater than the predetermined number of times. In a case where the measurement device 100 adopts the pulse signals 511 that are chronologically continuous, the information processing device 120 can calculate the biometric information from the pulse signals 511 that are chronologically continuous.

At step S610, the output unit 104 outputs the adopted data. Furthermore, the output unit 104 may output information necessary for calculating the biometric information to be measured.

Processing for extracting the pulse signal 511 will be described in detail with reference to FIG. 7.

Figure 7:
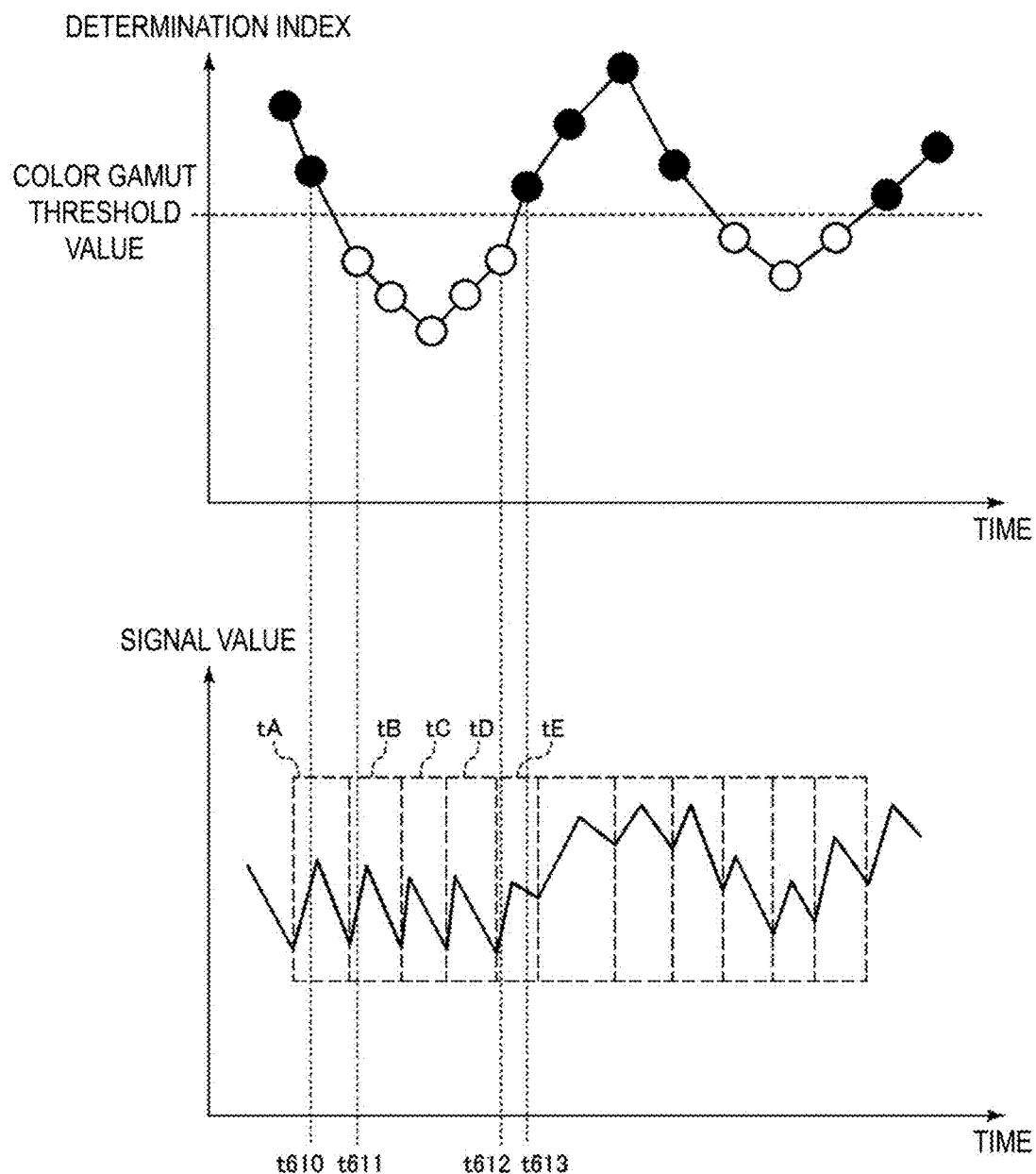
FIG. 7 is a diagram illustrating a graph showing an example of change over time of the determination index, and a graph showing an example of a time series signal indicating change over time of a signal value.

FIG. 7 is a diagram illustrating a graph showing an example of change over time of the determination index 122, and a graph showing an example of a time series signal indicating change over time of the signal value 121.

The upper diagram of FIG. 7 is a diagram illustrating a graph showing an example of a color gamut threshold value and change over time of the determination index 122. In the upper diagram of FIG. 7, the horizontal axis represents time and the vertical axis represents the determination index. In the upper diagram of FIG. 7, each of points shown on the graph indicates a value of the determination index 122 acquired at mutually different time points. Further, the lower diagram of FIG. 7 is a graph showing the example of the time series signal indicating change over time of the signal value 121. In the lower diagram of FIG. 7, the horizontal axis represents time and the vertical axis represents a value of the time series signal. For example, in a case where the time series signal shown in FIG. 7 indicates a pulse wave signal, the vertical axis of FIG. 7 indicates the intensity of the pulse wave.

The horizontal axis of the upper diagram and the horizontal axis of the lower diagram in FIG. 7 correspond to each other in terms of time. That is, the same value on the horizontal axis of the upper diagram and the horizontal axis of the lower diagram in FIG. 7 indicates the same time point. For the sake of explanation, an acquisition interval of the determination indices 122 in the upper diagram of FIG. 7 is shown in a rougher manner than a measurement interval of the time series signal in the lower diagram of FIG. 7. However, for example, in a case where the time series signal illustrated in the lower diagram of FIG. 7 indicates the pulse wave signal, it is preferable that the acquisition interval of the determination indices 122 is approximately the same as the measurement interval of the time series signal illustrated in the lower diagram of FIG. 7.

In the lower diagram of FIG. 7, a section tA to a section tE indicate a cycle of increase and decrease of the signal values 121. Thus, the cycle extraction unit 501 divides the time series signal acquired at step S602 into each of the sections tA to tE, and extracts the pulse signal 511 for each of the sections tA to tE.

For example, at a time point t610 and a time point t613, the determination index 122 is equal to or greater than the color gamut threshold value. In other words, the determination index 122 does not satisfy the determination condition at the time point t610 and the time point t613. Therefore, the color information determination unit 113 does not cause the measurement information storage unit 115 to store the pulse signal 511 in the section tA including the time point t610 and in the section tE including the time point t613 as the condition-met pulse.

On the other hand, in an interval from a time point t611 to a time point t612, all the determination indices 122 are less than the color gamut threshold value. That is, in the interval from the time point t611 to the time point t612, all the determination indices 122 satisfy the determination condition. Therefore, the color information determination unit 113 causes the measurement information storage unit 115 to store the pulse signal 511 in the section tB to the section tD, which are the sections corresponding to the interval from the time point t611 to the time point t612, as the condition-met pulse. As a result, the color information determination unit 113 can cause the measurement information storage unit 115 to store only the high-quality pulse in which the data of one cycle is completely collected, as the condition-met pulse.

Each of the processing executed in the above-described embodiment is not limited to the processing mode exemplified in each embodiment. The above-described functional blocks may be realized by using either a logic circuit (hardware) formed in an integrated circuit or the like, or by software using a CPU. The above implementations may be performed on a plurality of computers. For example, some of the processing executed by the functional blocks of the controller 103 of the measurement device 100 may be executed by another computer, or all of the processing may be shared and executed by a plurality of computers.

Note that the disclosure is not limited to the above-described embodiments and modified examples, and the above-described configuration can be replaced by substantially the same configuration, by a configuration that achieves substantially the same operation and effect, or by a configuration that can achieve the same object. An embodiment obtained by appropriately combining technical elements each disclosed in different embodiments also falls within the technical scope of the disclosure. Furthermore, technical elements disclosed in the respective embodiments may be combined to provide a new technical feature.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A measurement device comprising:
   a signal acquisition unit configured to acquire a signal value indicating an intensity of light transmitted through a living body or reflected by the living body;
   a color information acquisition unit configured to convert the signal value into color information;
   a color information determination unit configured to determine whether the color information satisfies a determination condition; and a signal correction unit configured to adopt the signal value when the color information that is converted from the signal value satisfies the determination condition, wherein:
the color information acquisition unit calculates a determination index based on the color information, and
the determination condition comprises the determination index being less than a color gamut threshold value.

2. The measurement device according to claim 1, wherein the signal correction unit adopts the signal value when the color information that is continuously converted from the signal value satisfies the determination condition for a period equal to or greater than an interval threshold value.

3. The measurement device according to claim 1, wherein the color information indicates a value in a plurality of color elements, and
the color information acquisition unit calculates the determination index based on a difference between the value indicated by the color information and a reference value.

4. The measurement device according to claim 1, further comprising:
a cycle extraction unit configured to extract a pulse signal that forms a cycle from a time series signal indicating a change over time of the signal value, wherein
the color information acquisition unit converts each of a plurality of signal values that forms the pulse signal into the color information.

5. The measurement device according to claim 4, wherein the signal correction unit adopts the pulse signal formed by the plurality of signal values when the color information that is converted from the plurality of signal values satisfies the determination condition.

6. A measurement system comprising:
the measurement device according to claim 1; and
an information processing device configured to calculate biometric information based on a change over time of the signal value adopted by the signal correction unit.

7. The measurement system according to claim 6, wherein the color gamut threshold value is determined based on-in accordance with a type of the biometric information.

8. The measurement system according to claim 6, wherein the signal correction unit adopts the signal value when the color information that is continuously converted from the signal value satisfies the determination condition for a period equal to or greater than an interval threshold value, and
the interval threshold value is determined based on in accordance with a type of the biometric information.

9. The measurement system according to claim 7, wherein the color information indicates a value in a plurality of color elements,
the color information acquisition unit further calculates a value of the determination index based on a difference between the value indicated by the color information and a reference value, and
the plurality of color elements and the reference value are determined based on the type of the biometric information.

10. A measurement method comprising:
acquiring a signal value indicating an intensity of light transmitted through a living body or reflected by the living body;
converting the signal value into color information;
determining whether the color information satisfies a determination condition; and
adopting the signal value when the color information that is converted from the signal value satisfies the determination condition, wherein:
a determination index is calculated based on the color information, and
the determination condition comprises the determination index being less than a color gamut threshold value.

11. The measurement device according to claim 2, wherein the color information indicates a value in a plurality of color elements, and
the color information acquisition unit calculates the determination index based on a difference between the value indicated by the color information and a reference value.

12. The measurement device according to claim 2, further comprising:
a cycle extraction unit configured to extract a pulse signal that forms a cycle from a time series signal indicating a change over time of the signal value,
wherein the color information acquisition unit converts each of a plurality of signal values that forms the pulse signal into the color information.

13. The measurement device according to claim 12, wherein the signal correction unit adopts the pulse signal formed by the plurality of signal values when the color information that is converted from the plurality of signal values satisfies the determination condition.

* * * * *